(12) United States Patent
Zhu et al.

(10) Patent No.: US 9,948,015 B2
(45) Date of Patent: Apr. 17, 2018

(54) THREE-IN-TWO CARD CONNECTOR AND MOBILE TERMINAL INCLUDING THREE-IN-TWO CARD CONNECTOR

(71) Applicant: Huawei Technologies Co., Ltd., Shenzhen, Guangdong (CN)

(72) Inventors: Haifeng Zhu, Shenzhen (CN); Weibin Lai, Shenzhen (CN); Xuelong Liu, Shenzhen (CN); Guoqiao Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/329,797

(22) PCT Filed: Jul. 31, 2014

(86) PCT No.: PCT/CN2014/083481
§ 371 (c)(1),
(2) Date: Jan. 27, 2017

(87) PCT Pub. No.: WO2016/015309
PCT Pub. Date: Feb. 4, 2016

(65) Prior Publication Data
US 2017/0250481 A1    Aug. 31, 2017

(51) Int. Cl.
*H01R 13/62*    (2006.01)
*H01R 12/72*    (2011.01)
(Continued)

(52) U.S. Cl.
CPC ......... *H01R 12/72* (2013.01); *H01R 12/7005* (2013.01); *H01R 13/17* (2013.01);
(Continued)

(58) Field of Classification Search
CPC ............... H01R 13/635; H01R 13/633; H01R 23/7068; H01R 23/6886; G06K 13/08; G06K 13/0806
(Continued)

(56) References Cited

U.S. PATENT DOCUMENTS 6,665,190 B2 * 12/2003 Clayton .................. H01L 23/13
257/E23.004
6,979,201 B1    12/2005 Lee et al.
(Continued)

FOREIGN PATENT DOCUMENTS

CN    101507059 A    8/2009
CN    201594678 U    9/2010
(Continued)

*Primary Examiner* — Hien Vu (57) ABSTRACT

The card connector includes a card connector base and a limiting structure. The card connector base includes a first area and a second area, the limiting structure includes a first limiting part and a second limiting part; the first limiting part is used to limit a first data card in the first area, and the second limiting part is used to limit a second data card or a third data card in the second area; a first spring plate group is disposed in the first area and is configured to electrically connect to edge connectors of the first data card; a second spring plate group and a third spring plate group are disposed in different positions of the second area; the second spring plate group is configured to electrically connect to edge connectors of the second data card; the third spring plate group is configured to electrically connect to edge connectors of the third data card.

8 Claims, 6 Drawing Sheets

(51) Int. Cl.
*H01R 13/17* (2006.01)
*H01R 12/70* (2011.01)
*H01R 13/635* (2006.01)
*H01R 25/00* (2006.01)
*H04B 1/3818* (2015.01)

(52) U.S. Cl.
CPC ............ *H01R 13/635* (2013.01); *H01R 25/00* (2013.01); *H04B 1/3818* (2015.01); *H01R 2201/16* (2013.01)

(58) Field of Classification Search
USPC .......................................... 439/159, 630, 631
See application file for complete search history.

(56) References Cited

U.S. PATENT DOCUMENTS

| | | | | |
|---|---|---|---|---|
| 7,351,109 B2 * | 4/2008 | Wang | ................ | H01R 13/2442 439/631 |
| 7,435,115 B2 * | 10/2008 | Kiryu | .................. | H01R 13/631 439/159 |
| 8,517,745 B1 * | 8/2013 | Yang | .................... | H01R 12/721 439/152 |
| 2007/0197068 A1 | 8/2007 | Kikuchi et al. | | |
| 2007/0249185 A1 | 10/2007 | Wang | | |
| 2013/0050964 A1 | 2/2013 | Kume | | |
| 2014/0099805 A1 | 4/2014 | Kutchery et al. | | |
| 2015/0079847 A1 | 3/2015 | Liu et al. | | |

FOREIGN PATENT DOCUMENTS

| | | |
|---|---|---|
| CN | 201789100 U | 4/2011 |
| CN | 103268998 A | 8/2013 |
| CN | 103367951 A | 10/2013 |
| CN | 203562592 U | 4/2014 |
| JP | 3101824 U | 6/2004 |
| JP | 2004206963 A | 7/2004 |
| JP | 2006302684 A | 11/2006 |
| JP | 3130287 U | 3/2007 |
| JP | 2013051134 A | 3/2013 |
| JP | 2013178886 A | 9/2013 |
| WO | 2007114591 A1 | 10/2007 |

\* cited by examiner

THREE-IN-TWO CARD CONNECTOR AND MOBILE TERMINAL INCLUDING THREE-IN-TWO CARD CONNECTOR

CROSS REFERENCE TO RELATED APPLICATIONS

The present application claims priority under 35 U.S.C. § 365 to International Patent Application No. PCT/CN2014/083481 filed Jul. 31, 2014 which is incorporated herein by reference into the present disclosure as if fully set forth herein.

TECHNICAL FIELD

The present invention relates to the field of signal card connection technologies, and in particular, to a three-in-two card connector and a mobile terminal including a three-in-two card connector.

BACKGROUND

Figure 1:
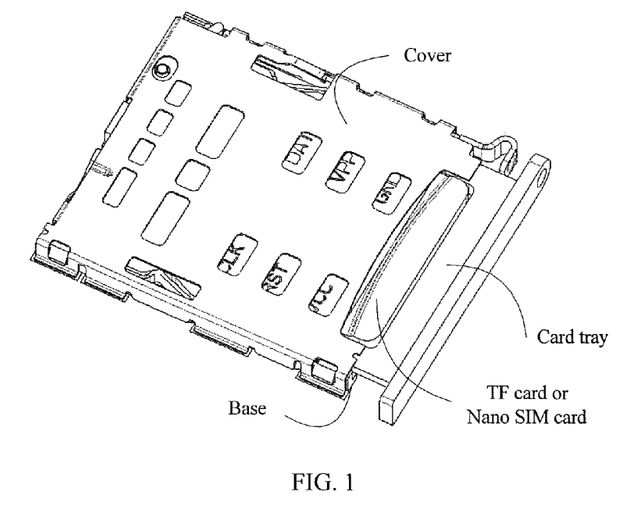
FIG. 1 is a schematic diagram of a two-in-one card connector in the prior art.

Nowadays, with continuous development of communications tools, structures, styles, and performance of mobile phones are updated increasingly frequently. To satisfy a multi-use requirement of a user, a two-in-one card connector appears. The card connector can be compatible with a nano subscriber identity module (English: Nano Subscriber Identity Module, Abbreviation: Nano SIM) card (which is also referred to as a fourth form element integrated circuit board) and a T-flash (English: T-flash, Abbreviation: TF) card, that is, a Nano SIM card or a TF card can be inserted by using a card connector. For example, FIG. 1 is a two-in-one card connector in the prior art. As shown in FIG. 1, the two-in-one card connector includes a base and a card tray. A TF card or a Nano SIM card is placed on the card tray, and side walls of the card tray limit the TF card or the Nano SIM card. Then the card tray is placed in the base of the card connector, so that contact terminals of the TF card or the Nano SIM card are in close connection with a spring plate group corresponding to the contact terminals.

However, it can be learned from the two-in-one card connector shown in FIG. 1 that another subscriber identity module (English: Subscriber Identity Module, Abbreviation: SIM) card cannot be inserted at the same time when the card connector is compatible with a Nano SIM card or a TF card. Consequently, multiple types of cards cannot be placed in one card connector at the same time, and selection freedom of a user is restricted.

SUMMARY

Embodiments of the present invention provide a three-in-two card connector and a mobile terminal including the card connector base, to resolve a problem in the prior art that multiple types of cards cannot be placed in one card connector at the same time, and increase selection freedom of a user.

To achieve the foregoing objective, the following technical solutions are used in the embodiments of the present invention:

According to a first aspect, an embodiment of the present invention provides a three-in-two card connector, including a card connector base and a limiting structure, where the card connector base includes a first area and a second area, where a first spring plate group is disposed in the first area, and a second spring plate group and a third spring plate group are separately disposed in different positions of the second area;

the limiting structure includes a first limiting part and a second limiting part, where the first limiting part is used to limit a first data card in the first area, and the second limiting part is used to limit a second data card or a third data card in the second area; and the first spring plate group is configured to electrically connect to edge connectors of the first data card when the first data card is limited in the first area; the second spring plate group is configured to electrically connect to edge connectors of the third data card when the second data card is limited in the second area; and the third spring plate group is configured to electrically connect to edge connectors of the third data card when the third data card is limited in the second area.

With reference to the first aspect, in a first possible implementation manner of the first aspect, the first limiting part is a first groove, where the first groove matches the first data card in shape, and is used to carry the first data card; and the second limiting part is a second groove, where the second groove matches the second data card in shape and is used to carry the second data card or the third data card.

With reference to the first possible implementation manner of the first aspect, in a second possible implementation manner of the first aspect, the three-in-two card connector further includes a connection structure, where the limiting structure is inserted into or removed from the card connector base by using the connection structure.

With reference to the second possible implementation manner of the first aspect, in a third possible implementation manner of the first aspect, the connection structure includes a first clamping member, a second clamping member, and a connecting rod and a card push apparatus that are separately connected to two ends of the second clamping member;

the first clamping member and the second clamping member are separately located on two sides of the card connector base that are parallel to an insertion and removal direction of the limiting structure;

the first clamping member and the second clamping member each include a protrusion part, two opposite sides of the limiting structure each include a depressed part, and when the limiting structure is inserted into the card connector base, the protrusion parts enter the depressed parts, and the limiting structure is fastened on the card connector base; and the connecting rod is configured to: control the card push apparatus, and when the connecting rod is in a pressed state, control the card push apparatus to eject the limiting structure from the card connector base.

With reference to the third possible implementation manner of the first aspect, in a fourth possible implementation manner of the first aspect, the first area and the second area are distributed in parallel on a surface of the card connector base relative to the insertion and removal direction of the limiting structure.

With reference to the third possible implementation manner of the first aspect, in a fifth possible implementation manner of the first aspect, the first area and the second area are distributed one after another on a surface of the card connector base relative to the insertion and removal direction of the limiting structure.

With reference to any one of the first possible implementation manner of the first aspect to the fifth possible implementation manner of the first aspect, in a sixth possible implementation manner of the first aspect, the three-in-two card connector further includes a cover, where the cover is disposed on the card connector base, the cover fixedly connects to two sides of the card connector base separately, and the cover and the card connector base form space for accommodating the limiting structure.

With reference to the first aspect, in a seventh possible implementation manner of the first aspect, the first area matches the first data card in shape;

the second area matches the second data card in shape and is used to carry the second data card or the third data card;

the first limiting part is a first baffle plate, where two opposite ends of the first baffle plate fixedly connect to two opposite sides of the first area respectively, and space as thick as the first data card is formed between the first baffle plate and the first area; and the second limiting part is a second baffle plate, where two opposite ends of the second baffle plate fixedly connect to two opposite sides of the second area respectively, and space as thick as the third data card or the second data card is formed between the second baffle plate and the second area.

According to a second aspect, an embodiment of the present invention provides a mobile terminal, including the three-in-two card connector according to any one of the first aspect to the seventh possible implementation manner of the first aspect.

In can be learned from above that, in the embodiments of the present invention, a three-in-two card connector and a mobile terminal including a three-in-two card connector are provided. The three-in-two card connector includes a card connector base and a limiting structure, where the card connector base includes a first area and a second area; a first spring plate group is disposed in the first area, and a second spring plate group and a third spring plate group are separately disposed in different positions of the second area; the limiting structure includes a first limiting part and a second limiting part, where the first limiting part is used to limit a first data card in the first area, and the second limiting part is used to limit a second data card or a third data card in the second area; the first spring plate group is configured to electrically connect to edge connectors of the first data card when the first data card is limited in the first area, the second spring plate group is configured to electrically connect to edge connectors of the third data card when the third data card is limited in the second area, and the third spring plate group is configured to electrically connect to edge connectors of the second data card when the second data card is limited in the second area. In this way, an information card placement area inside a card connector is expanded, so that a first data card and a second data card, or a first data card and a third data card are simultaneously placed in one card connector, which avoids a problem in the prior art that multiple types of cards cannot be placed in one card connector at the same time, increases selection freedom of a user, and improves user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To implement a multi-card application scenario, in embodiments of the present invention, a card placement area in an original card connector base is expanded, and a three-in-two card connector is provided. The three-in-two card connector includes a card connector base and a limiting structure.

The card connector base includes a first area and a second area, where a first spring plate group is disposed in the first area, and a second spring plate group and a third spring plate group are separately disposed in different positions of the second area.

The limiting structure includes a first limiting part and a second limiting part, where the first limiting part is used to limit a first data card in the first area, and the second limiting part is used to limit a second data card or a third data card in the second area.

The first spring plate group is configured to electrically connect to edge connectors of the first data card when the first data card is limited in the first area. The second spring plate group is configured to electrically connect to edge connectors of the second data card when the second data card is limited in the second area. The third spring plate group is configured to electrically connect to edge connectors of the third data card when the third data card is limited in the second area.

Preferably, the first data card may be a Micro SIM card, a Nano SIM card, or a SIM card of another type, which is not limited in this embodiment of the present invention.

The second data card may be a T-flash TF card or a data card of another type, and the third data card may be a Nano SIM card or a data card of another type, which is not limited in the present invention. In this embodiment of the present invention, the second data card and the third data card are only limited to be compatible in a same area of a card connector base.

Figure 2:
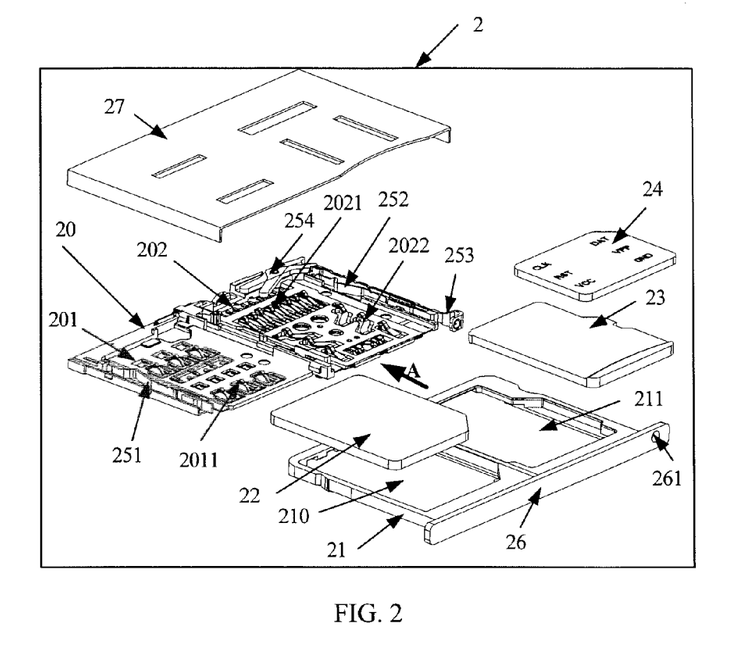
FIG. 2 is a structural diagram of a three-in-two card connector according to an embodiment of the present invention.
Figure 6:
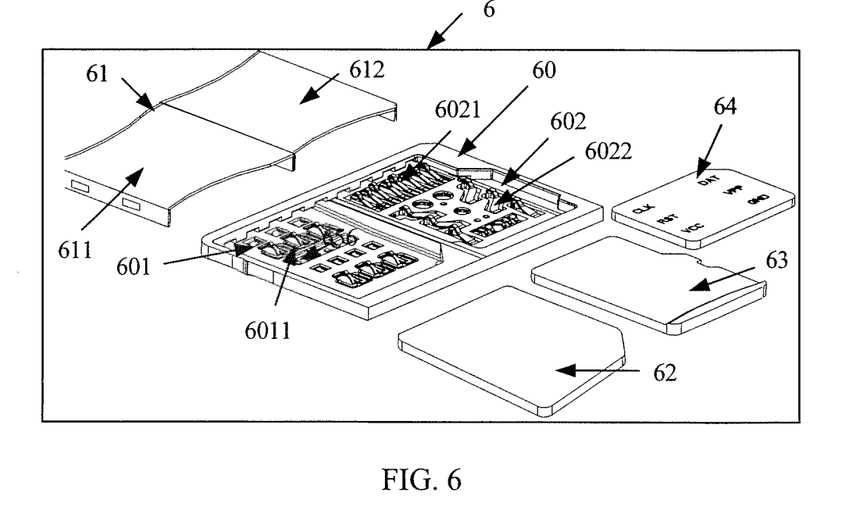
FIG. 6 is a structural diagram of a three-in-two card connector according to an embodiment of the present invention.

To limit different cards in different positions of a card connector base in different manners and implement electrical connection between the cards and spring plate groups, in the embodiments of the present invention, two types of three-in-two card connectors including different limiting structures are provided in FIG. 2 and FIG. 6. The following separately describes the two types of three-in-two card connectors.

FIG. 2 is a structural diagram of a three-in-two card connector 2 according to an embodiment of the present invention. As shown in FIG. 2, the three-in-two card connector 2 includes a card connector base 20 and a limiting structure 21.

The card connector base 20 includes a first area 201 and a second area 202. A first spring plate group 2011 is disposed in the first area 201, and a second spring plate group 2021 and a third spring plate group 2022 are separately disposed in different positions of the second area 202.

A first limiting part of the limiting structure 21 is a first groove 210, and a second limiting part of the limiting structure 21 is a second groove 211. The first groove 210 matches a first data card 22 in shape and is used to carry the first data card 22.

The second groove 211 is used to carry a second data card 23 and a third data card 24 not at the same time.

Preferably, the bottom of the first groove 210 and the bottom of the second groove 211 are empty, so that when the limiting structure 21 that carries the first data card 22 and the third data card 24 is inserted into the card connector base 20, edge connectors of the first data card 22 are in contact with the first spring plate group 2011, and edge connectors of the third data card 24 are in contact with the third spring plate group 2022.

When the limiting structure 21 that carries the first data card 22 and the second data card 23 is inserted into the card connector base 20, the edge connectors of the first data card 22 are in contact with the first spring plate group 2011, and edge connectors of the second data card 23 are in contact with the second spring plate group 2021.

Further, to enable the limiting structure 21 to be inserted into or removed from the card connector base 20, the three-in-two card connector 2 further includes a connection structure 25 (which is not shown in FIG. 2), and the limiting structure 21 is inserted into or removed from the card connector base 20 by using the connection structure 25.

As shown in FIG. 2, the connection structure 25 includes a first clamping member 251, a second clamping member 252, and a connecting rod 253 and a card push apparatus 254 that are separately connected to two ends of the second clamping member 252.

The first clamping member 251 and the second clamping member 252 are separately located on two sides of the card connector base 20 that are parallel to an insertion and removal direction (which is a direction shown by an arrow A in FIG. 2) of the limiting structure 21.

The first clamping member 251 and the second clamping member 252 each include a protrusion part.

Correspondingly, two opposite sides of the limiting structure 21 each include a depressed part. When a user pushes the limiting structure 21 to gradually insert the limiting structure 21 into the card connector base 20, the protrusion parts of the first clamping member 251 and the second clamping member 252 separately enter the depressed parts on the two sides of the limiting structure 21, so that the limiting structure 21 is fastened on the card connector base 22.

The connecting rod 253 is configured to: control the card push apparatus 254, and when the connecting rod 253 is in a pressed state, control the card push apparatus 254 to eject the limiting structure 21 from the card connector base 20.

Correspondingly, to press the connecting rod 253, the three-in-two card connector 2 further includes a handle 26 that fixedly connects to an end of the limiting structure 21, and the handle 26 includes a pinhole 261.

When the user needs to remove the limiting structure 21 from the card connector base 20, a tool such as a card eject pin may be used to press the connecting rod 253 by using the pinhole 261, and the card push apparatus 254 pops out, so that the protrusion part of the second clamping member 252 leaves the depressed part of the limiting structure 21, and the limiting structure 21 is ejected from the card connector base 20.

It should be noted that the connection structure 25 is not limited to the structure shown in FIG. 2, and may be a structure of another type that is used for inserting the limiting structure 21 into or removing the limiting structure 21 from the card connector base 20, which is not limited in this embodiment of the present invention.

Figure 3A:
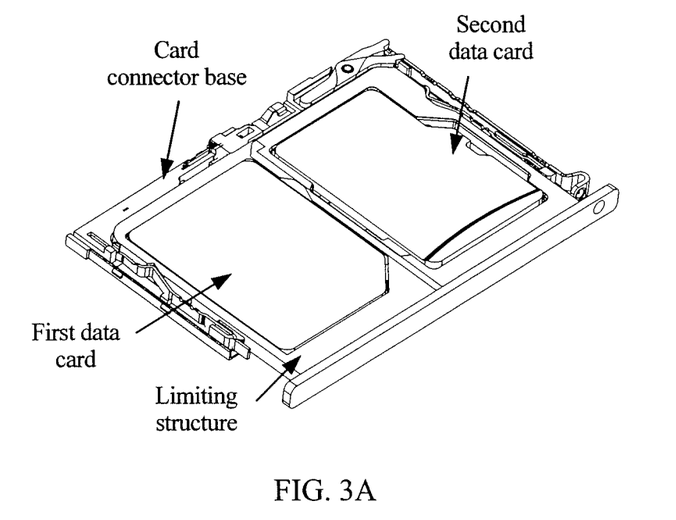
FIG. 3A is a schematic diagram of carrying a first data card and a second data card by a three-in-two card connector according to an embodiment of the present invention.
Figure 3B:
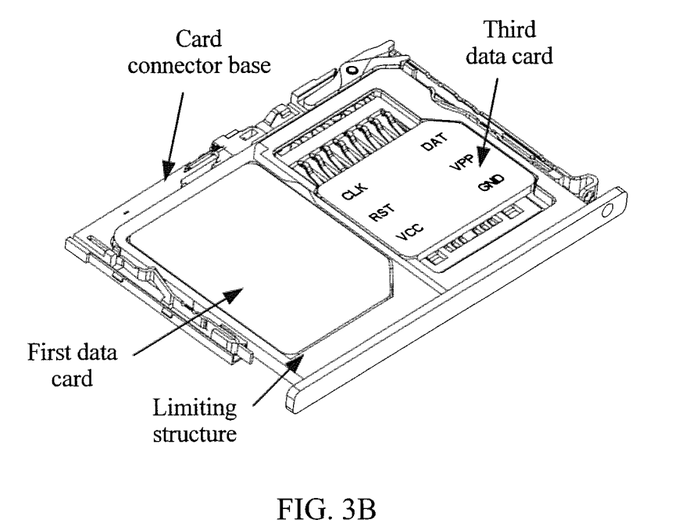
FIG. 3B is a schematic diagram of carrying a first data card and a third data card by a three-in-two card connector according to an embodiment of the present invention.
Figure 4A:
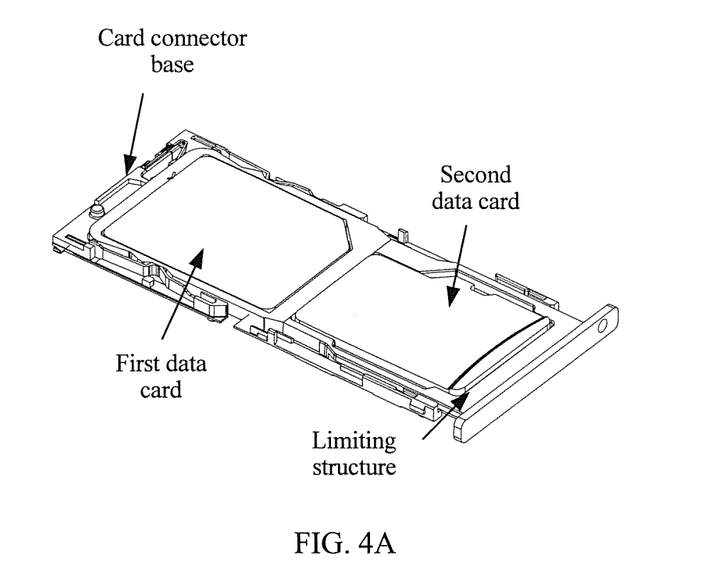
FIG. 4A is a schematic diagram of carrying a first data card and a second data card by a three-in-two card connector according to an embodiment of the present invention.
Figure 4B:
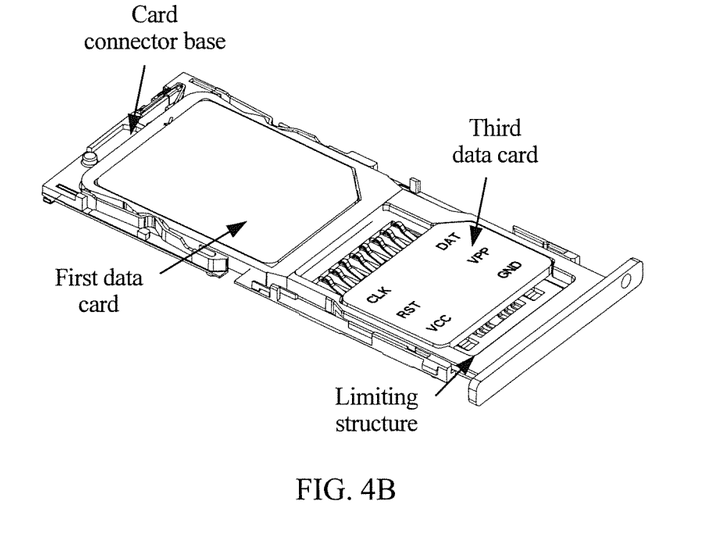
FIG. 4B is a schematic diagram of carrying a first data card and a third data card by a three-in-two card connector according to an embodiment of the present invention.

Further, in this embodiment of the present invention, relative placement of the first data card 22 and the second data card 23, or the first data card 22 and the third data card 24 is not limited, which may be parallel placement shown in FIG. 3A and FIG. 3B, or may be one-after-another serial connection placement shown in FIG. 4A and FIG. 4B.

To implement the parallel placement shown in FIG. 3A and FIG. 3B, as shown in FIG. 2, the first area 201 of the card connector base 20 and the second area 202 of the card connector base are distributed in parallel on a surface of the card connector base relative to the insertion and removal direction (which is the direction shown by the arrow A in FIG. 2) of the limiting structure.

Figure 5:
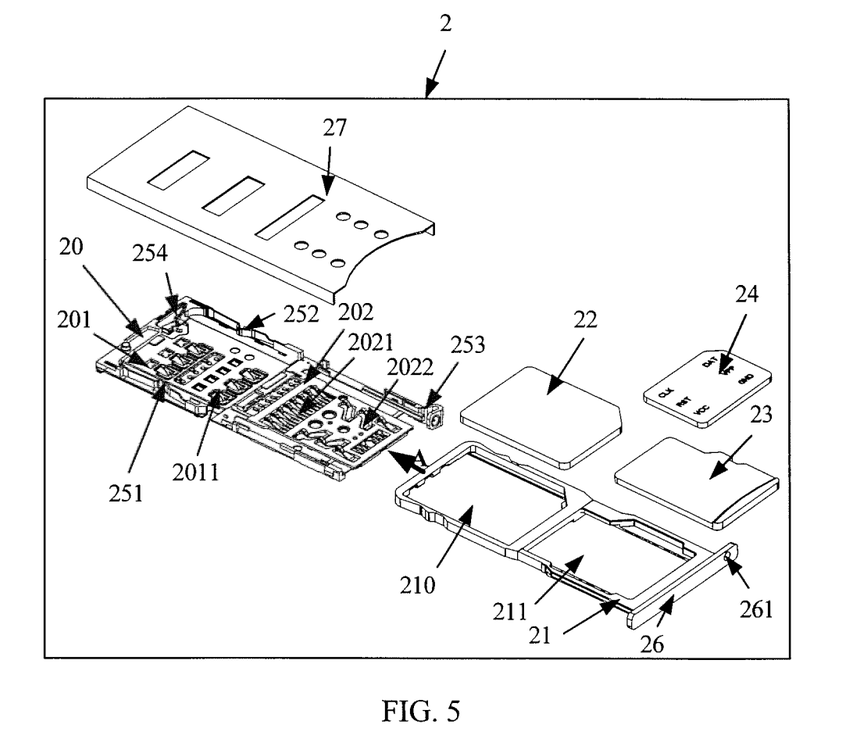
FIG. 5 is a structural diagram of a three-in-two card connector according to an embodiment of the present invention.

To implement the one-after-another serial connection placement shown in FIG. 4A and FIG. 4B, as shown in FIG. 5, the first area 201 of the card connector base 20 and the second area 202 of the card connector base 20 are distributed one after another on a surface of the card connector base relative to the insertion and removal direction (which is a direction shown by an arrow A in FIG. 5) of the limiting structure.

Further, to prevent interference of an electromagnetic signal on a data card, preferably, the three-in-two card connector 2 shown in FIG. 2 may further include a cover 27.

The cover 27 is disposed on the card connector base 20, and fixedly connects to two sides of the card connector base 20 separately, and the cover 27 and the card connector base 20 form space for accommodating the limiting structure 21, so that it is convenient for the limiting structure 21 to be inserted into or ejected from the card connector base 20.

Preferably, the cover 27 may be a metal housing.

It should be noted that, when the first data card 22 is a Nano SIM card, the first area 201 of the card connector base may further include a fourth spring plate group (which is not shown in FIG. 2) configured to electrically connect to edge connectors of a fourth data card (which is not shown in FIG. 2).

Correspondingly, the first groove 210 of the limiting structure 21 may further match the fourth data card in shape and is used to carry the first data card or the fourth data card.

Preferably, the fourth data card may be a T-flash TF card.

It can be learned from above that, in the three-in-two card connector 2 provided in FIG. 2, a card placement area is expanded. Therefore, a first data card and a third data card or a first data card and a second data card can be placed in one card connector at the same time, so that cards of multiple types are placed in one card connector at the same time, a user application scenario is increased, and user experience is improved. In addition, a first information card, a second information card, or a memory card can be inserted into or removed from a card connector base by inserting or removing a limiting structure on the card connector base.

FIG. 6 is a structural diagram of a three-in-two card connector 6 according to an embodiment of the present invention. As shown in FIG. 6, the three-in-two card connector 6 includes a card connector base 60 and a limiting structure 61.

The card connector base 60 includes a first area 601 and a second area 602. A first spring plate group 6011 is disposed in the first area 601, and a second spring plate group 6021 and a third spring plate group 6022 are separately disposed in different positions of the second area 602.

The first spring plate group 6011 is configured to electrically connect to edge connectors of a first data card 62 when the first data card 62 is limited in the first area 601. The second spring plate group 6021 is configured to electrically connect to edge connectors of a second data card 63 when the second data card 63 is limited in the second area 602. The third spring plate group 6022 is configured to electrically connect to edge connectors of a third data card 64 when the third data card 64 is limited in the second area 602.

Preferably, the first area 601 matches the first data card 62 in shape and is used to carry the first data card 62.

The second area 602 is used to carry the second data card 63 or the third data card 64.

A first limiting part included in the limiting structure 61 is a first baffle plate 611. Two opposite ends of the first baffle plate 611 fixedly connect to two opposite sides of the first area 601 separately, and space as thick as the first data card 62 is formed between the first baffle plate 611 and the first area 601, where the space is used to limit the first data card 62 in the first area 601. In this way, when a user directly inserts the first data card 62 into the first area 601, the first baffle plate 611 fastens the first data card 62 in the first area 601.

A second limiting part included in the limiting structure 61 is a second baffle plate 612. Two opposite ends of the second baffle plate 612 fixedly connect to two opposite sides of the second area 602 separately, and space as thick as the second data card 63 or the third data card 64 is formed between the second baffle plate 612 and the second area 602, where the space is used to limit the second data card 63 or the third data card 64 in the second area 602. In this way, when the user directly inserts the third data card 63 or the second data card 64 into the second area 602, the second baffle plate 612 fastens the third data card 63 or the second data card 64 in the second area 602.

It should be noted that, when the first data card 62 is a Nano SIM card, the first area 601 of the card connector base may further include a fourth spring plate group (which is not shown in FIG. 6) configured to electrically connect to edge connectors of a fourth data card (which is not shown in FIG. 6).

The first area 601 may further match the fourth data card in shape and is used to carry the first data card or the fourth data card.

Preferably, the fourth data card may be a T-flash TF card.

It can be learned from above that, in the three-in-two card connector 6 provided in FIG. 6, a card placement area is expanded. Therefore, a first data card and a third data card or a first data card and a second data card can be placed in one card connector at the same time, so that cards of multiple types are placed in one card connector at the same time, a user application scenario is increased, and user experience is improved. In addition, the first data card, the second data card, or the third data card can be limited on a card connector base by using a limiting structure that includes a fastening baffle plate.

Figure 7:
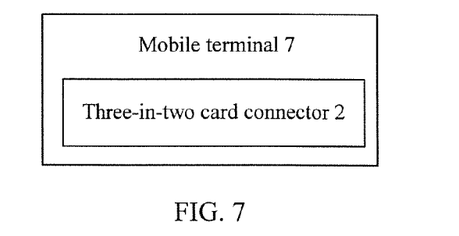
FIG. 7 is a structural diagram of a mobile terminal according to an embodiment of the present invention.

FIG. 7 is a mobile terminal 7 according to an embodiment of the present invention. As shown in FIG. 7, the mobile terminal 7 includes a three-in-two card connector 2.

The three-in-two card connector 2 is the same as the three-in-two card connector 2 described in Embodiment 1, and details are not described herein again.

It should be noted that the mobile terminal 7 may implement a function of a cover 27 of the three-in-two card connector 2 by using an internal structure of the mobile terminal 7. When the three-in-two card connector 2 is included in the mobile terminal 7, the three-in-two card connector 2 may not include the cover 27, which further reduces space occupied by the three-in-two card connector 2.

It can be learned from above that, in this embodiment of the present invention, a mobile terminal 7 that includes a three-in-two card connector 2 is provided. In the three-in-two card connector 2 in the mobile terminal 7, a card placement area is expanded. Therefore, a first data card and a third data card or a first data card and a second data card can be placed in one card connector at the same time, so that cards of multiple types are placed in one card connector at the same time, a user application scenario is increased, and user experience is improved. In addition, when the mobile terminal is used, a card can be inserted into or removed from a card connector base in the mobile terminal by inserting or removing a limiting structure on the card connector base and without a need of detaching a back cover of the mobile terminal.

Figure 8:
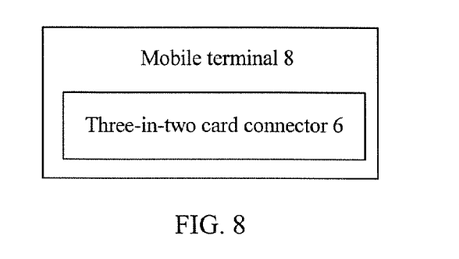
FIG. 8 is a structural diagram of a mobile terminal according to an embodiment of the present invention.

FIG. 8 is a mobile terminal 8 according to an embodiment of the present invention. As shown in FIG. 8, the mobile terminal 8 includes a three-in-two card connector 6.

The three-in-two card connector 6 is the same as the three-in-two card connector 6 shown in FIG. 6, and details are not described herein again.

It can be learned from above that, in this embodiment of the present invention, a mobile terminal 8 that includes a three-in-two card connector 6 is provided. In the three-in-two card connector in the mobile terminal, a card placement area is expanded. Therefore, a first data card and a third data card or a first data card and a second data card can be placed in one card connector at the same time, so that cards of multiple types are placed in one card connector at the same time, a user application scenario is increased, and user experience is improved. In addition, when the mobile terminal is used, a card can be directly inserted into or removed from a card connector base by using a limiting structure that includes a fastening baffle plate and without a need of detaching a back cover of the mobile terminal.

The foregoing descriptions are merely specific implementation manners of the present invention, but are not intended to limit the protection scope of the present invention. Any variation, replacement or a simple combination readily figured out by a person skilled in the art within the technical scope disclosed in the present invention shall fall within the protection scope of the present invention. Therefore, the protection scope of the present invention shall be subject to the protection scope of the claims.

What is claimed is:

1. An electrical card connector, comprising:
   a card connector base comprising a first area and a second area, wherein a first spring plate group is disposed in the first area, and a second spring plate group and a third spring plate group are separately disposed in different positions in the second area;
   a limiting structure comprising a first limiting part and a second limiting part, wherein the first limiting part is a first groove, and the first groove is used to carry a first data card; and the second limiting part is a second groove, and the second groove is used to carry a second data card or a third data card, wherein the first data card is a Nano SIM card, the second data card is a T-flash (TF) card, and the third data card is a Nano SIM card;
   a handle fixedly connected to one end of the limiting structure, the handle comprising a pinhole, and when the third data card is placed in the second groove, a notch on the third data card is away from the handle;
   wherein when the limiting structure is inserted into the card connector base, the first limiting part is used to limit the first data card in the first area, and the second limiting part is used to limit the second data card or the third data card in the second area, and the first area and the second area are distributed one after another on a surface of the card connector base in an insertion and removal direction of the limiting structure; and
   wherein the first spring plate group is configured to electrically connect to edge connectors of the first data card when the first data card is limited in the first area, the second spring plate group is configured to electrically connect to edge connectors of the second data card when the second data card is limited in the second area, and the third spring plate group is configured to electrically connect to edge connectors of the third data card when the third data card is limited in the second area.

2. An electrical card connector, comprising:
   a card connector base comprising a first area and a second area, wherein a first spring plate group is disposed in the first area, and a second spring plate group and a third spring plate group are disposed in different positions in the second area;
   a limiting structure comprising a first limiting part and a second limiting part, wherein the first limiting part is used to limit a first data card in the first area, and the second limiting part is used to limit a second data card or a third data card in the second area, wherein the first limiting part is a first groove, and the first groove is used to carry the first data card, and the second limiting part is a second groove, and the second groove is used to carry the second data card or the third data card;
   a handle fixedly connected to one end of the limiting structure, the handle comprising a pinhole, and when the third data card is placed in the second groove, a notch on the third data card is away from the handle; and
   wherein the first spring plate group is configured to electrically connect to edge connectors of the first data card when the first data card is limited in the first area, the second spring plate group is configured to electrically connect to edge connectors of the second data card when the second data card is limited in the second area, and the third spring plate group is configured to electrically connect to edge connectors of the third data card when the third data card is limited in the second area.

3. The electrical card connector according to claim 2, wherein:
   the connection structure comprises a first clamping member, a second clamping member, and a connecting rod and a card push apparatus that are separately connected to two ends of the second clamping member;
   the first clamping member and the second clamping member are separately located on two sides of the card connector base that are parallel to an insertion and removal direction of the limiting structure;
   the first clamping member and the second clamping member each comprise a protrusion part, two opposite sides of the limiting structure each comprise a depressed part, and when the limiting structure is inserted into the card connector base, the protrusion parts enter the depressed parts, and the limiting structure is fastened on the card connector base; and
   the connecting rod is configured to:
      control the card push apparatus, and
      when the connecting rod is in a pressed state, control the card push apparatus to eject the limiting structure from the card connector base.

4. The electrical card connector according to claim 3, wherein:
   the first area and the second area are distributed in parallel on a surface of the card connector base relative to the insertion and removal direction of the limiting structure.

5. The electrical card connector according to claim 3, wherein:
   the first area and the second area are distributed one after another on a surface of the card connector base relative to the insertion and removal direction of the limiting structure.

6. The electrical card connector according to claim 2, further comprising:
   a cover disposed on the card connector base, the cover fixedly connects to two sides of the card connector base separately, and the cover and the card connector base form space for accommodating the limiting structure.

7. The electrical card connector according to claim 2, wherein:
   the first area is used to carry the first data card;
   the second area is used to carry the second data card or the third data card;
   the first limiting part is a first baffle plate, wherein two opposite ends of the first baffle plate fixedly connect to two opposite sides of the first area respectively, and a space as thick as the first data card is formed between the first baffle plate and the first area; and
   the second limiting part is a second baffle plate, wherein two opposite ends of the second baffle plate fixedly connect to two opposite sides of the second area respectively, and a space as thick as the third data card or the second data card is formed between the second baffle plate and the second area.

8. A mobile terminal, comprising:
an electrical card connector comprising,
   a card connector base comprising a first area and a second area, wherein a first spring plate group is disposed in the first area, and a second spring plate group and a third spring plate group are separately disposed in different positions in the second area,
   a limiting structure comprising a first limiting part and a second limiting part, wherein the first limiting part is a first groove, and the first groove is used to carry a first data card; and the second limiting part is a second groove, and the second groove is used to carry a second data card or a third data card, wherein the first data card is a Nano SIM card, the second data card is a T-flash (TF) card, and the third data card is a Nano SIM card, and
   a handle fixedly connected to one end of the limiting structure, the handle comprising a pinhole, and when the third data card is placed in the second groove, a notch on the third data card is away from the handle;
   wherein when the limiting structure is inserted into the card connector base, the first limiting part is used to limit the first data card in the first area, and the second limiting part is used to limit the second data card or the third data card in the second area, and the first area and the second area are distributed one after another on a surface of the card connector base in an insertion and removal direction of the limiting structure; and
   wherein the first spring plate group is configured to electrically connect to edge connectors of the first data card when the first data card is limited in the first area, the second spring plate group is configured to electrically connect to edge connectors of the second data card when the second data card is limited in the second area, and the third spring plate group is configured to electrically connect to edge connectors of the third data card when the third data card is limited in the second area.

* * * * *